No. 716,597. Patented Dec. 23, 1902.
G. S. THOMPSON.
EVENER FOR CORN HARVESTERS.
(Application filed Jan. 25, 1902.)
(No Model.)
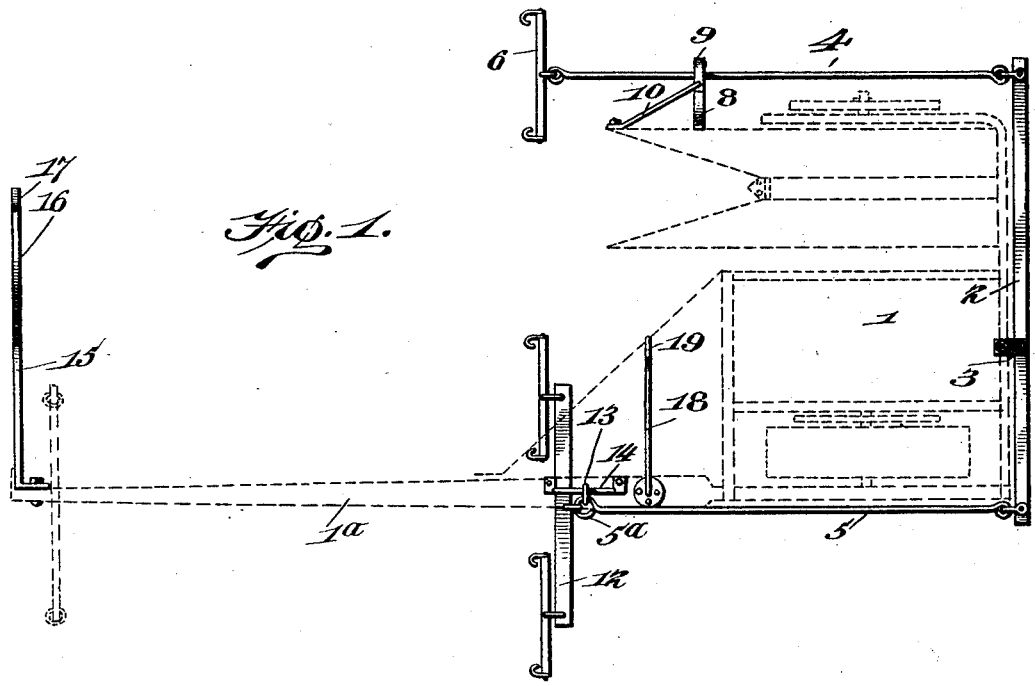
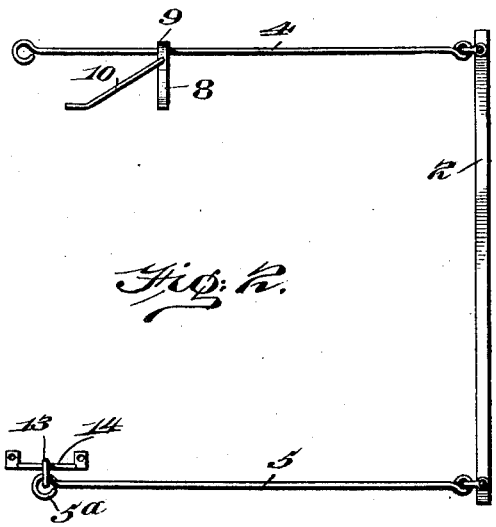
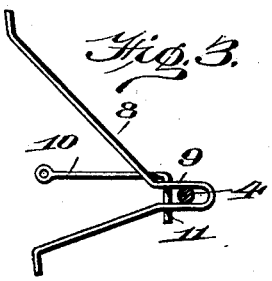
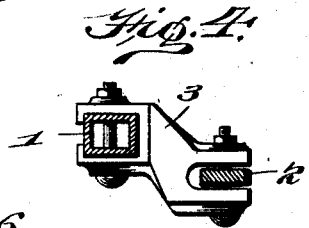
Inventor
Gust. S. Thompson
Witnesses
H. G. Dieterich
H. H. Simms
By Knight Bro.
Attorneys

United States Patent Office.

GUSTAVUS S. THOMPSON, OF SVERDRUP, SOUTH DAKOTA.

EVENER FOR CORN-HARVESTERS.

SPECIFICATION forming part of Letters Patent No. 716,597, dated December 23, 1902.

Application filed January 25, 1902. Serial No. 91,181. (No model.)

*To all whom it may concern:*

Be it known that I, GUSTAVUS S. THOMPSON, a citizen of the United States, residing at Sverdrup, in the county of Minnehaha, State of South Dakota, have invented certain new and useful Improvements in Corn-Harvesters, of which the following is a specification.

My invention relates to corn-harvesters; and it has for one of its objects to provide an improved manner of mounting a horse-evener upon a corn-harvester of that class in which some of the horses travel upon one side of an uncut row of corn and others travel upon the opposite side.

A further object is to provide means by which the horses upon both sides of the uncut row may be connected together in front of the cutting mechanism without interfering with the cornstalks.

A still further object is to provide means for supporting the reins at a sufficient height so that they will not be caught in the uncut stalks.

Still further objects and advantages will appear in the following description, and will be pointed out in the appended claims.

In the drawings forming a part of this specification, Figure 1 is a plan view of a corn-harvester in dotted lines, with my improvements shown in plan and in full lines. Fig. 2 is a plan view of the equalizer or evener detached from the corn-harvester. Fig. 3 is a rear view of the guide for one of the draft-rods. Fig. 4 is a side view of the clamp by which the equalizer-bar is secured to the frame. Fig. 5 is a detail view of the means by which the horses upon both sides of the uncut row are secured together at their heads, and Fig. 6 is a detail view of the means for supporting the reins.

Like numerals indicate like parts throughout the specification and all the figures of the drawings.

The corn-harvester 1 is provided with a tongue 1ª and has secured thereto in the rear of the cutting mechanism an equalizer-bar 2 by means of a clamp 3. Extending forwardly from the ends of said equalizer-bar 2 and upon the sides of the harvester are draft-rods 4 and 5. The draft-rod 4 has secured to its forward end a singletree 6 and is guided and held to the harvester by a guide secured to the harvester and consisting of an approximately V-shaped bracket 8 forward with a U-shaped extension 9 in which the draft-rod 4 is guided; and, to hold the draft-rod 4 within the extension of the bracket and at the same time to strengthen the bracket, a brace 10 having a depending end 11 which is fitted within two perforations 12 in the U-shaped extension 9, is provided. The draft-rod 5 is provided with an eye 5ª at its forward end, to which is secured a doubletree, and is guided and held to the harvester by a ring 13, secured within the eye 5ª and working on a guide-bar 14, secured at each end to the harvester, preferably the tongue 1ª.

Extending at right angles from the end of the tongue 1ª on one side of the machine is a tie 15 to guide the horses upon both sides of the machine in the same direction. This tie 15 (see Fig. 5) is deflected upwardly at 16, so as not to interfere with the uncut stalks of corn, and is provided with an eye 17, by which the horse on the side opposite the tongue is secured. To prevent the uncut stalks from interfering with the reins, I secure to the tongue an upwardly-extending arm 18, bent at right angles and provided at its end with an eye 19, through which the reins are guided.

Various changes may be made in the form, proportion, and minor details of the invention without departing from the spirit of my invention.

Having thus described my invention, what I claim is—

1. In a corn-harvester, the combination with the cutting mechanism, and an equalizer-bar secured in the rear thereof, of draft-rods extending forwardly therefrom, a guide consisting of an approximately V-shaped bracket having a U-shaped extension in which one of the draft-rods is mounted, and a brace for strengthening the bracket and retaining the draft-rod within the U-shaped extension.

2. In a corn-harvester, the combination with the cutting mechanism, an equalizer-bar, mounted in the rear of the cutting mechanism, and draft-rods extending therefrom, of a guide-bar for one of the draft-rods secured at each end to the machine, and a ring secured to said draft-rod and working on the guide-bar.

3. In a corn-harvester, the combination with the cutting mechanism, and an equalizer-bar secured in rear thereof, of draft-rods secured to the ends of the equalizer-bar upon both sides of the machine; a singletree secured to one of the draft-rods; a doubletree secured to the other draft-rod; a guide for the singletree draft-rod comprising an approximately V-shaped bracket having a U-shaped extension which receives the said draft-rod, and a brace secured to the harvester and having a depending end which is fitted in perforations in the U-shaped extension; and a guide for the doubletree draft-rod comprising a guide-bar secured at each end to the harvester, and a ring connecting the draft-rod and the guide-bar.

4. In a corn-harvester, the combination with the cutting mechanism, a horse-evener secured in the rear of the cutting mechanism, and provided with means to hold some of the horses upon one side of the cutting mechanism and some on the other side, and a tongue mounted upon one side of the cutting mechanism, and securing only the horses on said side, of means carried by the tongue, in front of the cutting mechanism for connecting the horses on the other side of the cutting mechanism.

5. In a corn-harvester, the combination with the cutting mechanism, means holding horses upon both sides of the cutting mechanism, and a tongue mounted upon one side of the cutting mechanism and securing only the horses on said side, of means secured to the tongue, and adapted to guide the horse upon the opposite side of the cutting mechanism.

6. The combination of the corn-harvester carrying a tongue upon one side of the cutting mechanism, means for holding horses upon both sides of the cutting mechanism, and a tie secured near the end of the tongue, extending at right angles therefrom and provided with an upwardly-deflected portion adapted to pass over the row of uncut corn; the horse on the side of the cutting mechanism opposite the tongue being secured to said tie.

7. The combination of the corn-harvester carrying a tongue upon one side of the cutting mechanism, a three-horse evener or equalizer secured in rear of the cutting mechanism, a doubletree secured to the equalizer on the side of the cutting mechanism upon which the tongue is mounted, a singletree secured to the equalizer upon the opposite side of the cutting mechanism, and a tie secured near the forward end of the tongue, at right angles thereto, and provided with an upwardly-deflected portion.

8. The combination of a corn-harvester carrying a tongue upon one side of the cutting mechanism, a three-horse evener or equalizer secured in the rear of the cutting mechanism, a doubletree secured to the equalizer on the side of the cutting mechanism, upon which the tongue is mounted, a singletree secured to the equalizer upon the opposite side of the cutting mechanism, and means for supporting the reins over the uncut stalks.

9. The combination of a corn-harvester carrying a tongue upon one side of the cutting mechanism, a three-horse evener or equalizer secured in the rear of the cutting mechanism, a doubletree secured to the equalizer on the side of the cutting mechanism upon which the tongue is mounted, a singletree secured to the equalizer upon the opposite side of the cutting mechanism, and an arm secured to the tongue and bent at right angles, to support the reins over the uncut stalks.

GUST. S. THOMPSON.

Witnesses:
E. J. LAUGNESS,
L. K. LARSON.